United States Patent
Wood et al.

[11] Patent Number: 5,986,828
[45] Date of Patent: Nov. 16, 1999

[54] OPTICAL POWER LIMITER UTILIZING NONLINEAR REFRACTION

[75] Inventors: Gary L. Wood, Fairfax; Edward J. Sharp, Stafford Co.; Richard R. Shurtz, II, Fairfax; Mary J. Miller, Fairfax Co., all of Va.

[73] Assignee: The United States of America as represented by the Secretary of the Army, Washington, D.C.

[21] Appl. No.: 07/268,461

[22] Filed: Nov. 1, 1988

[51] Int. Cl.$^6$ ........................................... G02B 6/32
[52] U.S. Cl. .............................. 359/890; 359/738; 372/21
[58] Field of Search .................... 350/311–313, 316, 350/168; 372/21, 703; 329/144; 351/213; 359/738, 890

[56] References Cited

U.S. PATENT DOCUMENTS

| | | | |
|---|---|---|---|
| 3,395,961 | 8/1968 | Ready | 350/354 |
| 3,620,597 | 11/1971 | Schwartz et al. | 351/213 |
| 3,714,430 | 1/1973 | Finvold et al. | 350/316 |
| 4,093,353 | 6/1978 | Lang | 350/313 |
| 4,114,985 | 9/1978 | Friedman | 219/121 L |
| 4,549,788 | 10/1985 | Chenia | 350/393 |
| 4,819,239 | 4/1989 | Sharp et al. | 372/108 |

OTHER PUBLICATIONS

Lehmberg, R. H.; "A System for Compensating Self Fousing . . . Lasers"; MTIS AD–D003 162/5, 10 pages; Aug. 3, 1976.

Bertsev et al; "Self focusing and Self–Defocusing . . . Gases"; Opt. Spectrosc., vol. 51, #2, pp. 178–182, Aug. 1981.

*Primary Examiner*—Nelson Moskowitz
*Attorney, Agent, or Firm*—Milton W. Lee; John E. Holford; Anthony T. Lane

[57] ABSTRACT

A power limiter is provided consisting of two cells of optically transparent material having a low index of refraction, but a large third order susceptibility to electric polarization. The input cell has a positive susceptibility which self-focuses intense radiation beams (i.e., laser beams) and the output cell has a negative susceptibility which scatters the even more intense self-focused beam by self-defocussing.

5 Claims, 3 Drawing Sheets ns herein may be manufactured,
OPTICAL POWER LIMITER UTILIZING NONLINEAR REFRACTION The invention described herein may be manufactured, used, and licensed by the U.S. Government for governmental purposes without the payment of any royalties thereon.

BACKGROUND OF INVENTION

Since the advent of high power lasers there has been an increased emphasis on the protection of low light level sensors (including human eyes). It is well known that optical sensors can be damaged by exposure to intense laser radiation of both pulsed and CW varieties. Protectors or optical limiters may be of two general types, active or passive. Active optical limiters require a predetermination of the presence of threat radiation and then must provide an external stimulus (such as an applied electric field) to operate the limiter. Active devices are usually complex (tunable filters for example) and are unable to respond to short pulses or bursts of harmful radiation. Passive protectors are preferred since the threat radiation itself triggers the desired protective response.

An ideal protector must fulfill various requirements: it must not degrade or attenuate desired radiation (low insertion loss), it must provide complete blocking of radiation above some predetermined threshold (harmful to the sensor or eyes), it must be sensitive over a sufficiently wide wavelength range to block all undesired radiation, it must have a wide field-of-view, it must (in many cases) be fast acting (for pulsed lasers), and it must be capable of simultaneously blocking a multiplicity of intense laser wavelengths emanating from a single source.

There has been considerable interest in protecting all electro-optical sensor systems including; for example, infrared detectors; against high-power infrared laser threats such as line-tunable carbon dioxide ($CO_2$) lasers. These IR detectors are used in night vision devices by the military and are vulnerable to both damage and jamming (overload) in the presence of high-energy laser countermeasures. The output of such a laser could be at any nominal frequency within the response band of the detector in a night vision device. In particular, sensitive infrared optical detectors used in systems with high optical gain (focusing) such as FLIRs can be rendered useless and even destroyed by accidental or deliberate illumination with intense far infrared (FIR) sources, particularly $CO_2$ lasers. The object of the present invention is, therefor, to passively protect optical sensors, detectors, the eye, as well as night vision devices such as FLIR's.

SUMMARY OF THE INVENTION

The invention provides a passive optical limiter capable of fast reaction and simple implementation. The limiter can be placed in any optical detection system having an intermediate focal plane in the optical path to the detector. The limiter employs two similar optical components with flat parallel surfaces and nonlinear indices of refraction located substantially on opposite sides and proximate to the above focal plane. The components present a uniform index of refraction to low level light traversing the optical path. However, the components are chosen to have large positive and negative third order susceptibilities to electric polarization, respectively, so that they, respectively, cause self-focusing and self-defocussing of intense light from a distance source such as a laser, at the focal point of the linear elements of the optical system. By placing most of the positive component ahead of the linear focal plane the increasing intensity of the focused beam has a boot-strap effect that results in a greatly decreased focused-spot size and consequently greater intensity. This in turn assists the negative component in its intensity dependent defocussing effect to scatter most of the energy of the laser beam out of the systems optical path entirely.

BRIEF DESCRIPTION OF THE DRAWINGS

The invention is best understood with reference to the accompanying drawings wherein.

DESCRIPTION OF THE PREFERRED EMBODIMENT

Figure 1:
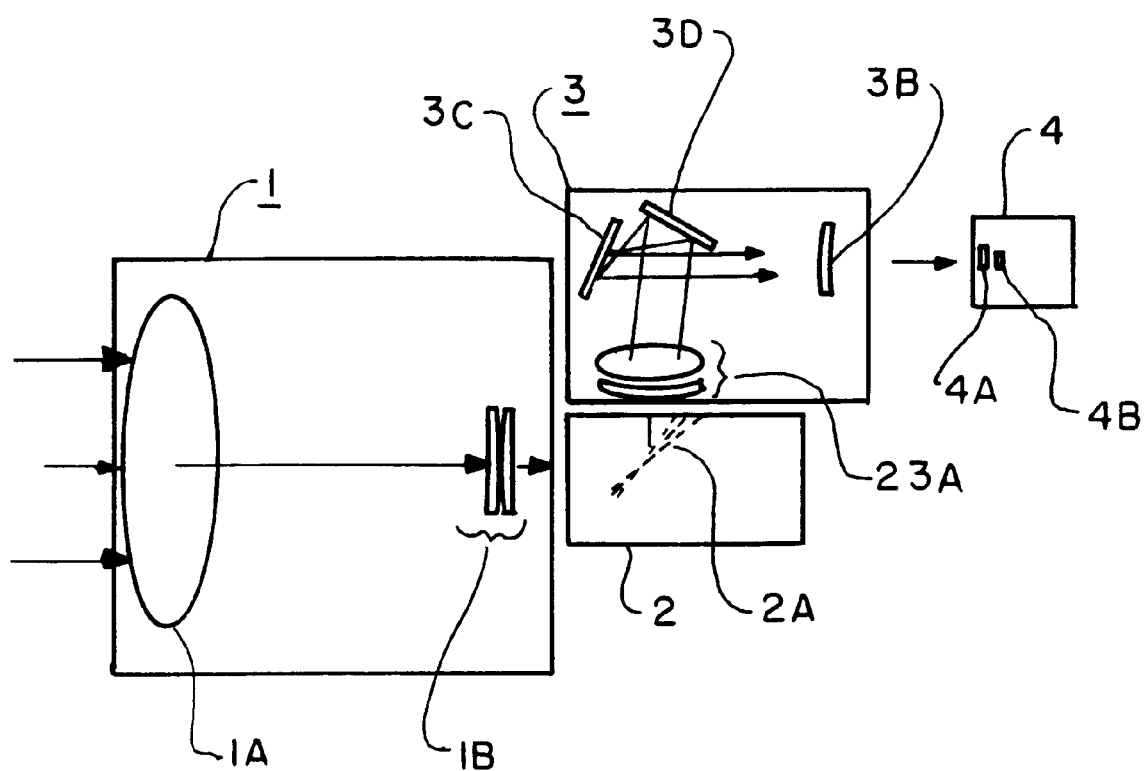
FIG. 1 shows a diagram of a modified far-infrared imaging device known as a FLIR.

Referring to FIG. 1 there is shown one type of environment in which the present invention can be used. The optical system shown is a Forward Looking Infrared Imager (FLIR). The FLIR is divided into four sections. Section 1 is the afocal section and includes a large objective lens 1A to gather low level light from a distant target and a collimating lens 1B. Section 2 contains a moving mirror to shift the collimated light image in an X or Y direction normal to the optical axis. Section 3 is an imaging section which contains input and output lenses 3A and 3B respectively and a pair of folding mirrors 3C and 3D which extend the path length sufficiently to provide an intermediate focal point between lenses 3A and 3B as well as a focal plane for the detected image beyond lens 3B. Section 4 contains a dewar with a window 4A to admit the detected image and a cooled detector array 4B, which detects the image one line at a time as it is shifted by section 2.

Figure 2:
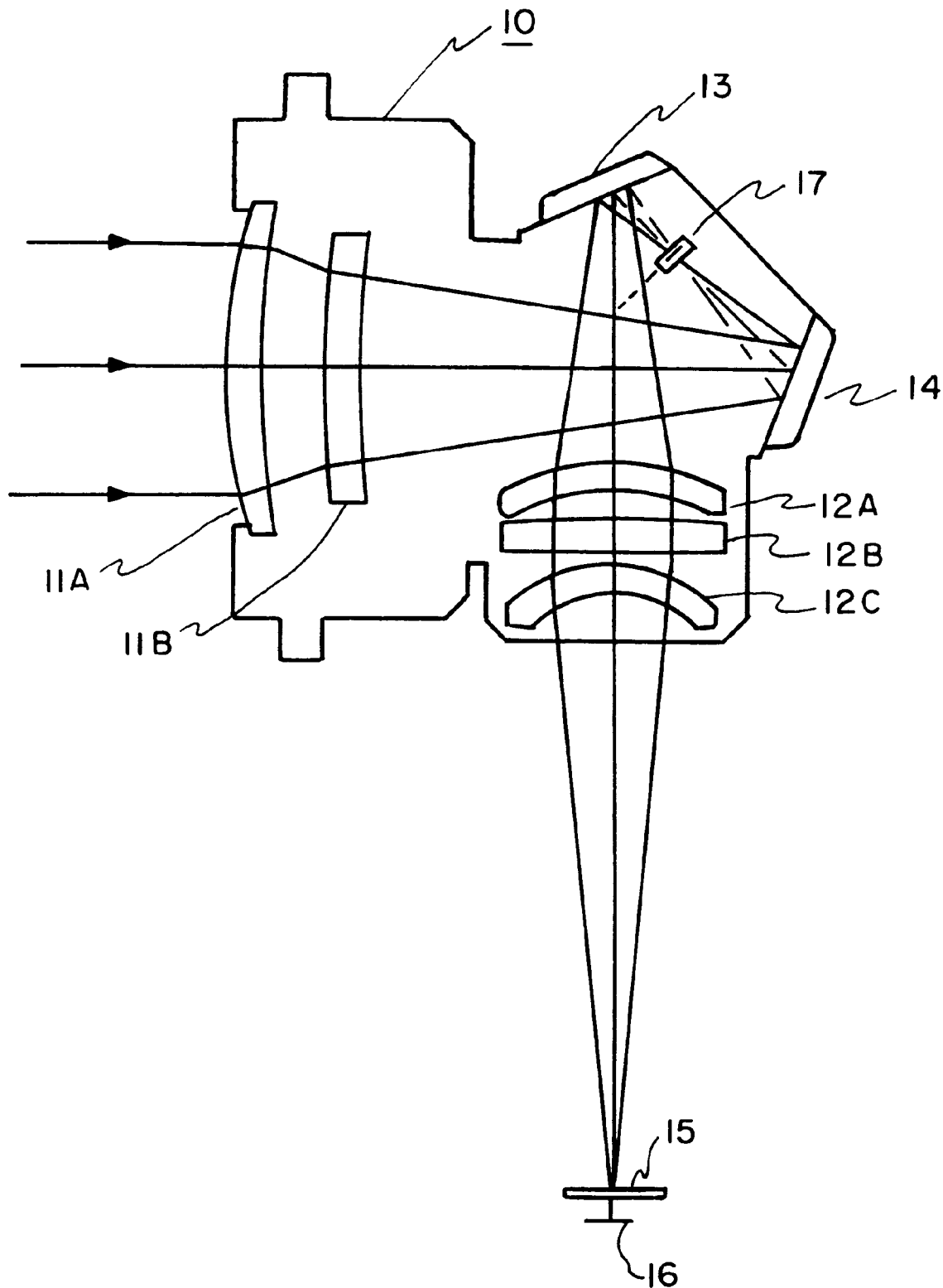
FIG. 2 shows a detailed view of the imager section 3 of the FIG. 1 device with a limiter 17 according to the present invention.

FIG. 2 shows section 3 of FIG. 1 in greater detail. The section consists of the assembly 10 with an input lens formed from lens elements 11A and 11B. The output lens is formed from lens elements 12A, 12B and C. Folding mirrors 13 and 14 redirect the optical path forming an intermediate focal plane between themselves. The output lens forms a detectable image at a focal plane behind the dewar window 15 on the surface 16 of detector. For the purposes of the present invention an optical power limiter 17 is placed at the intermediate focal point.

Figure 3:
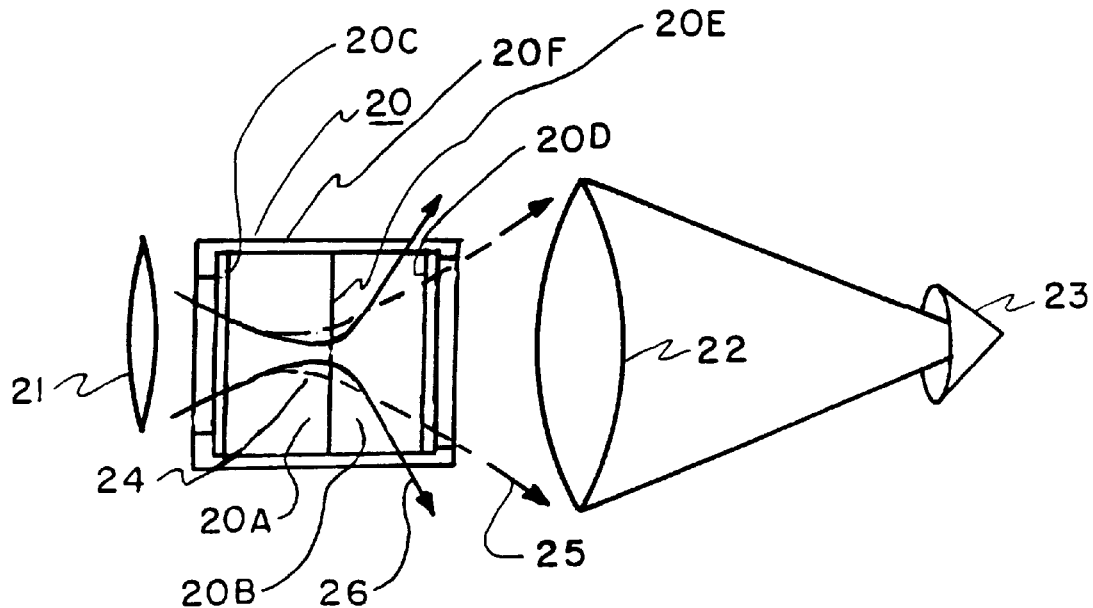
FIG. 3 shows a general diagram of an optical detection system containing a thick cell limiter according to the present invention.

FIG. 3 shows a thick cell power limiter 20 according to the present invention. The limiter can be used in any system having an input lens 21, an output lens 22 and a low light level detector 23 arranged such that an intermediate focal plane 24 exists between the lenses. At this plane the input radiation is tightly focused to a beam a focal spot size Wo. The limiter consists of two cells 20A and 20B having substantially the same indices of refraction at low light levels of $n_A$ and $n_B$ respectively, that is, $n_A$ $n_B$. The index of refraction for materials 20A and 20B can be expressed as a constant term, $n_o$, plus a term which is proportional to the incident intensity, 1. The second term can be written as $n_{2A}I$ for cell 20A where $n_{2A}$ is positive and $n_{2B}I$ for cell 20B where $n_{2B}$ is negative. These indices are referred to as the nonlinear indices of refraction and are proportional to the third order susceptibility. Therefore the total index of refraction for materials 20A and 20B are written as $n_A=n_o+n_{2A}I$ and $n_B=n_o+n_{2B}I$ respectively. The Rayleigh range in the cells is defined as $Z_o=\pi W^2 n/\lambda_o$ where n is the index of refraction of the cell and $\lambda_o$ is the wavelength of the incident radiation. A thick cell has a dimension along the optical path or axis many times $Z_o$. Conversely a thin cell has a similar dimension on the order of $Z_o$. The embodiment in this figure employs the two cells in a contiguous relationship. Liquid cells are preferred because of their low damage threshold when irradiated by intense laser beams. Windows 20C and 20D, Preferably AR-coated, are provided to contain the liquid and may consist of a linear material as used for lens 21. A thin transparent membrane 20E separates the liquids used in each cell, with little or no interaction between the membrane and the incident radiation such as polymerized plastic. A shell 20F supports the windows and membrane and may be made of the window material or any material of suitable structural strength. If a suitable solid material is used for cells 20A and 20B the windows, frame and membrane may be omitted.

The liquid or solid material in the cells is a material which exhibits a large third order nonlinearity. Such materials respond to high intensity radiation from high power lasers and the like with substantial changes in refractive index. These changes in turn result in self-focusing or self-defocussing of beamed radiation particularly when large cross-sectional variations (e.g. Gaussian) are present. For best results the membrane 20E or the interface between cells 20A and 20B is located very close to an intermediate focal plane of the system. The cell 20A nearest the input lens is formed of a material with a positive third order susceptibility so that the refractive index in areas with light intensity causing self-focusing. The material in cell 20B is formed of a material with a negative third order susceptibility so that the refractive index decreases with light intensity causing self-defocussing. As previously stated the focused spot size is reduced by self-focusing resulting in a much higher intensity at the focus and causes greater defocussing in cell 20B than could be achieved without the nonlinear action of cell 20A. By abutting the negative cell to the focal plane, the extreme intensity attained by self-focusing immediately initiates self defocussing where it is most effective, scattering the light from path 25 to path 26, for example, so that only a small fraction is caught by the output lens. Even the fraction caught by the lens is so distorted that the output lens cannot efficiently focus it on the detector. The system of course cannot perform its low light level function while the intense radiation persists, but that function quickly returns when the intense radiation is removed or deflected by other means.

Suitable nonlinear materials for the cells are found in the "CRC HANDBOOK OF LASER SCIENCE AND TECHNOLOGY", Vol. III Optical Materials: Part 1, Edited by Marvin J. Weber, published 1986. An excellent solid material for thin cells which will be discussed presently, is a polymerized material built up in layers of molecular thickness by the Langmuir-Blodgett method as disclosed in U.S. Pat. No. 4,431,263 "Novel Nonlinear Optical Materials", by Anthony F. Garito, issued Feb. 18, 1984. The response time of these materials at a given high level of radiation is less than the time required to exceed the damage threshold of a detector by the same high level of radiation.

Figure 4:
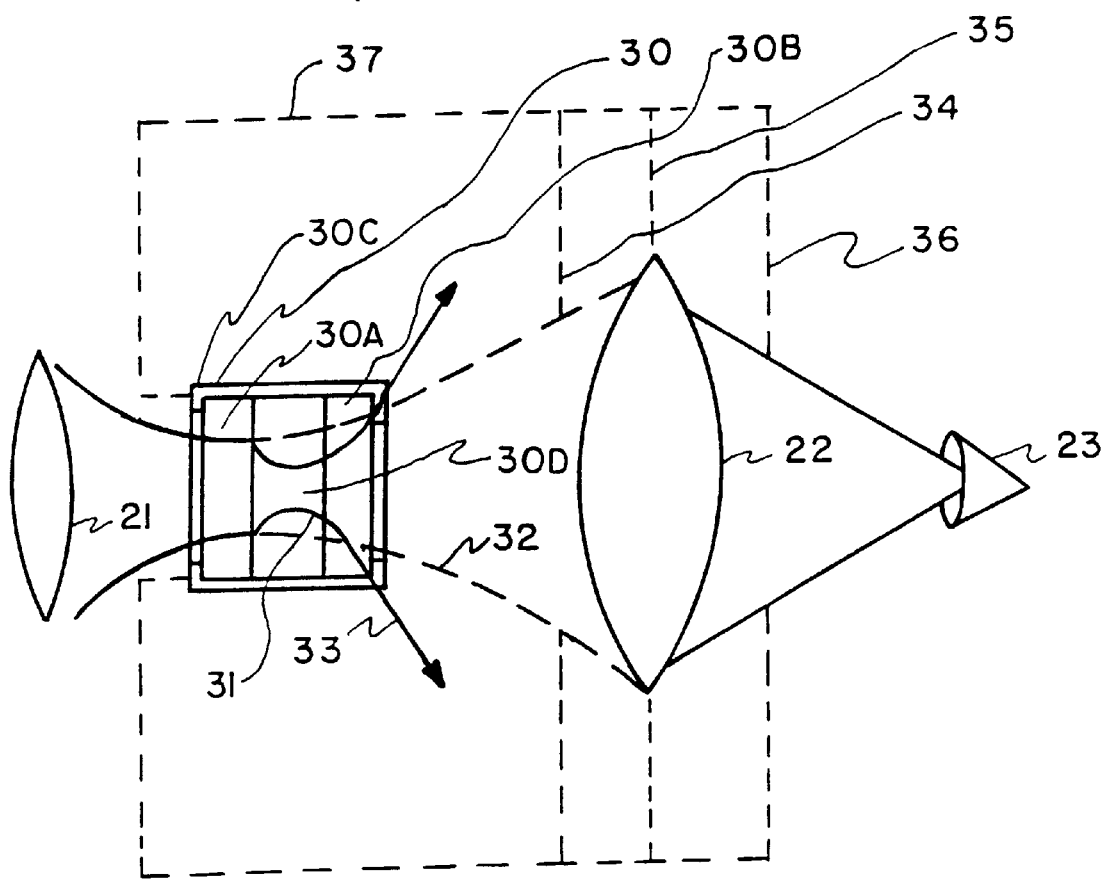
FIG. 4 shows a limiter with nonlinear materials in a thin cell configuration.

FIG. 4 shows a similar system and optical power limiter to that shown in FIG. 3, but having thin refocusing cells 30A and 30B. Unlike the thick cells, the two thin cells are spaced from and on opposite sides of the focal plane to avoid the extremely high intensity in that region. Thin cells have their surfaces exposed to high intensity radiation and consequently exhibit a much lower damage threshold than the thick cells. Some materials are reasonably available only in thin film form, however, have third order susceptibilities to electric polarization ten or more times greater than thick materials or liquids. A supporting frame 30C interconnects the positive and negative cells. The space 30D between the cells and frame can be sealed and evacuated to prevent localized heating or dielectric breakdown at the focal point. As previously shown, radiation emerging from the focal plane region 31 is scattered from its normal path 32 to a wide angle path 33. If desired, a limiter could be made with one thick and one thin cell. One maintaining the focus in the evacuated space between the cells with a thick output cell 20B beyond the focal point to enhance the defocussing of the device.

To prevent reflection of the scattered light back into the optical path, the system may be provided with suitably placed baffles 34, 35 and 36. These baffles may be connected directly to a housing in the system or connected by an extension 37 of frame 30C so that the limiter and baffles may be one replaceable unit. The baffles cover all parts of the optical path through the output lens that are not beneficial to the detector. This includes edge portions of spherical lenses that distort rather than enhance the focused image.

We claim:

1. In combination with an optical system having input and output lenses and an optical path for radiation within a given spectrum therebetween defining a focal point for said radiation, a power limiter comprising:

a housing member surrounding said focal point;

first and second cells of dielectric material, transparent to said spectrum and having a large third order susceptibility to electric polarization, mounted within said housing, said cells having positive and negative third order susceptibilities, respectively, with the positive first cell closest to said input lens.

2. The combination according to claim 1, wherein:

said cells are thick and contiguous with said focal point in said first cell adjacent the juncture of the cells.

3. The combination according to claim 1, wherein:

said cells are thin optical structures spaced from said focal point.

4. The combination according to claim 2, wherein:

said cells each contain a different liquid medium; and only a thin diaphagm of polymerized plastic transparent to said spectrum seperates the two liquid media.

5. The combination according to claim 3, wherein:

each cell is formed of a layered film of polymerized plastic.

* * * * *